US012353980B2

(12) United States Patent
Ukil et al.

(10) Patent No.: US 12,353,980 B2
(45) Date of Patent: Jul. 8, 2025

(54) SYSTEM AND METHOD FOR MITIGATING GENERALIZATION LOSS IN DEEP NEURAL NETWORK FOR TIME SERIES CLASSIFICATION

(71) Applicant: Tata Consultancy Services Limited, Mumbai (IN)

(72) Inventors: Arijit Ukil, Kolkata (IN); Soma Bandyopadhyay, Kolkata (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1050 days.

(21) Appl. No.: 17/357,614

(22) Filed: Jun. 24, 2021

(65) Prior Publication Data

US 2022/0027711 A1    Jan. 27, 2022

(30) Foreign Application Priority Data

Jun. 26, 2020    (IN) .............................. 202021027210

(51) Int. Cl.
G06N 3/04    (2023.01)
G06N 3/047    (2023.01)
G06N 3/06    (2006.01)
G06N 3/063    (2023.01)
G06N 3/08    (2023.01)

(52) U.S. Cl.
CPC ............. *G06N 3/047* (2023.01); *G06N 3/063* (2013.01); *G06N 3/08* (2013.01)

(58) Field of Classification Search
CPC .......... G06N 3/047; G06N 3/063; G06N 3/08; G06N 3/045; G06N 3/048; G06N 3/084
See application file for complete search history.

(56) References Cited

U.S. PATENT DOCUMENTS 11,816,971 B2 * 11/2023 Long ..................... G01J 5/00
2019/0095818 A1    3/2019 Varadarajan et al.

OTHER PUBLICATIONS

Rolinek, Michal, and Georg Martius. "L4: Practical loss-based stepsize adaptation for deep learning." Advances in neural information processing systems 31 (2018). (Year: 2018).*

(Continued)

*Primary Examiner* — Hal Schnee
(74) *Attorney, Agent, or Firm* — FINNEGAN, HENDERSON, FARABOW, GARRETT & DUNNER LLP

(57) ABSTRACT

This disclosure relates generally to a system and a method for mitigating generalization loss in deep neural network for time series classification. In an embodiment, the disclosed method includes compute an entropy of a timeseries training dataset, and a mean and a variance of the entropy and a regularization factor is computed. A plurality of iterations are performed to dynamically adjust the learning rate of the deep Neural Network (DNN) using a Mod-Adam optimization, and obtain a network parameter, and based on the network parameter, the regularization factor is updated to obtain an updated regularized factor. The learning rate is adjusted in the plurality of iterations by repeatedly updating the network parameter based on a variation of a generalization loss during the plurality of iterations. The updated regularized factor of the current iteration is used for adjusting the learning rate in a subsequent iteration of the plurality of iterations.

11 Claims, 4 Drawing Sheets

(56) References Cited

OTHER PUBLICATIONS

Kashiparekh, Kathan, et al. "Convtimenet: A pre-trained deep convolutional neural network for time series classification." 2019 international (Year: 2019).*

Beglerovic, Halil, et al. "Deep learning applied to scenario classification for lane-keep-assist systems." Applied Sciences 8.12 (2018): 2590. (Year: 2018).*

Kolter, J. Zico, and Andrew Y. Ng. "Regularization and feature selection in least-squares temporal difference learning." Proceedings of the 26th annual international conference on machine learning. 2009. (Year: 2009).*

Tellenbach, Bernhard, et al. "Accurate network anomaly classification with generalized entropy metrics." Computer Networks 55. 15(2011): 3485-3502 (Year: 2011).*

Fan, Long, et al. "Deep topology network: A framework based on feedback adjustment learning rate for image classification." Advanced Engineering Informatics 42 (2019): 100935. (Year: 2019).*

He, Kaiming, et al. "Deep residual learning for image recognition." Proceedings of the IEEE conference on computer vision and pattern recognition. 2016. (Year: 2016).*

Wang, Zhen et al., "Automatic Hyperparameter Tuning of Machine Learning Models under Time Constraints", International Conference on Big Data (Big Data), Dec. 2018, IEEE.

Pouyanfar, Samira et al., "T-LRA: Trend-based Learning Rate Annealing for Deep Neural Networks", Third International Conference on Multimedia Big Data (BigMM), Apr. 2017, IEEE.

Rolínek, Michal et al., "L4: Practical loss-based stepsize adaptation for deep learning", Machine Learning, Nov. 2018, Arxiv.

* cited by examiner

SYSTEM AND METHOD FOR MITIGATING GENERALIZATION LOSS IN DEEP NEURAL NETWORK FOR TIME SERIES CLASSIFICATION

PRIORITY CLAIM

This U.S. patent application claims priority under 35 U.S.C. § 119 to: India Application No. 202021027210, filed on Jun. 26, 2020. The entire contents of the aforementioned application are incorporated herein by reference.

TECHNICAL FIELD

The disclosure herein generally relates to time series classification, and, more particularly, to system and method for mitigating generalization loss in deep neural network for time-series classification.

BACKGROUND

Deep residual learning has shown tremendous success in image and video analytics (visual applications). Deep residual learning is being utilized for solving learning degradation problem when the depth of the deep network is increased. However, due to presence of intricate and diverse patterns in practical time series signals, deep residual learning demands rich feature space exploration that covers not only temporal, but also spectral as well as time-frequency characterization. A rich feature space is achieved by an unsupervised feature space integrated residual mapping, that enriches the learning process by introducing newer representation.

To solve time-series classification (TSC) problem, a conventional network is considered as a baseline deep neural network (DNN). The baseline DNN-inspired architecture has historically demonstrated excellent performance in various classification problems (mainly in visual applications). The crux of success is the addition of identity mapping of the input signal such that the non-linear mapping function (say, Rectified Liner Unit—ReLU) acts on the residual part. However, time series signals are more stochastic than the image or visual signals. With the augmentation of the feature space that captures the intrinsic patterns (in different transformed domain like wavelet, spectral), a neural network attempts to enhance the capability of residual learning through a refined representation channel. However, such augmentation of the feature space leads to overfitting on training dataset of deep learning network (or Neural Network) when the model attempts to fit to a high-dimension feature vector.

SUMMARY

Embodiments of the present disclosure present technological improvements as solutions to one or more of the above-mentioned technical problems recognized by the inventors in conventional systems. For example, in one embodiment, a method for mitigating generalization loss in deep neural network for time-series classification is provided. The method includes receiving, via one or more hardware processors, a timeseries training dataset comprising a plurality of training samples. Further, the method includes computing, via the one or more hardware processors, an entropy of the timeseries training dataset, and a mean and a variance of the entropy. Furthermore, the method includes computing, via the one or more hardware processors, a regularization factor based on the mean and the variance of the timeseries training data. Also, the method includes performing a plurality of iterations, via the one or more hardware processors, wherein each iteration of the plurality of iterations comprises dynamically adjusting the learning rate of the deep neural network using a Mod-Adam optimization, and obtain a network parameter; and updating, based on the network parameter, the regularization factor to obtain an updated regularized factor, wherein adjusting the learning rate in the plurality of iterations comprises repeatedly updating the network parameter based on a variation of a generalization loss during the plurality of iterations; and wherein, the updated regularized factor of a current iteration is used for adjusting the learning rate in a subsequent iteration of the plurality of iterations.

In another aspect, a system for mitigating generalization loss in deep neural network for time-series classification is provided. The system includes one or more memories; and one or more hardware processors, the one or more memories coupled to the one or more hardware processors, wherein the one or more hardware processors are configured to execute programmed instructions stored in the one or more memories to receive a timeseries training dataset comprising a plurality of training samples. The one or more hardware processors are further configured by the instructions to compute an entropy of the timeseries training dataset, and a mean and a variance of the entropy. Furthermore, the one or more hardware processors are further configured by the instructions to compute a regularization factor based on the mean and the variance of the timeseries training data. Also, the one or more hardware processors are further configured by the instructions to perform a plurality of iterations, wherein to perform each iteration of the plurality of iterations, the one or more hardware processors are configured by the instructions to dynamically adjust the learning rate of the deep NN using a Mod-Adam optimization, and obtain a network parameter; and update, based on the network parameter, the regularization factor to obtain an updated regularized factor; wherein to adjust the learning rate in the plurality of iterations, the one or more hardware processors are configured by the instructions to repeatedly update the network parameter based on a variation of a generalization loss during the plurality of iterations; and wherein, the updated regularized factor of a current iteration is used for adjusting the learning rate in a subsequent iteration of the plurality of iterations.

In yet another aspect, a non-transitory computer readable medium for a method for mitigating generalization loss in deep neural network for time-series classification is provided. The method includes receiving, via one or more hardware processors, a timeseries training dataset comprising a plurality of training samples. Further, the method includes computing, via the one or more hardware processors, an entropy of the timeseries training dataset, and a mean and a variance of the entropy. Furthermore, the method includes computing, via the one or more hardware processors, a regularization factor based on the entropy, the mean and the variance of the entropy. Also, the method includes performing a plurality of iterations, via the one or more hardware processors, wherein each iteration of the plurality of iterations comprises dynamically adjusting the learning rate of the deep NN using a Mod-Adam optimization, and obtain a network parameter; and updating, based on the network parameter, the regularization factor to obtain an updated regularized factor, wherein adjusting the learning rate in the plurality of iterations comprises repeatedly updating the network parameter based on a variation of a generalization loss during the plurality of iterations; and wherein, the updated regularized factor of a current iteration is used for adjusting the learning rate in a subsequent iteration of the plurality of iterations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Time series signals play a major role for developing array of applications in Internet of Things (IoT), ranging from healthcare, transportation, retail and many other domains. However, time Series Classification or TSC is a major challenge in IoT applications. Deep residual learning was introduced to solve the learning degradation problem in time series signals when the depth of the neural network, for example, deep network is increased. The learning problem is to layer-wise recursive learning of $\mathcal{H}_{l+1}(\chi) = \mathcal{H}_l(\chi) + \mathcal{G}_l(\mathcal{H}_l(\chi))$, where $\mathcal{G}_l$ is the non-linear neural network (say, convolution network), $\mathcal{H}_l(x)$ is the residual function and $\mathcal{H}_0(\chi)=0$, $\mathcal{G}_0(\mathcal{H}_0(\chi))=\chi$, $\chi$ is the input time series.

Typically, individual layers in residual networks attempt to modify the learnt representation from the previous layers. It does not learn new representation. However, learning by purely modifying the input $\chi$ throughout the learning process may be incomplete. The model has the chance to suffer from the internal co-variance shift problem when $l^{th}$ layer irrelevant feature $\mathcal{H}_l(\chi)$ is encountered in the residual function $\mathcal{H}_{l+1}(\chi) = \mathcal{H}_l(\chi) + \mathcal{G}_l(\mathcal{H}_l(\chi))$. Such potential inferior model learning is due to the strong coupling of $\mathcal{H}_l(\chi)$ with $\chi$. Since mere modification of representation space is insufficient, the input representation is refining along with enrichment of the learning through augmented representation space that can provide the necessary impetus to the residual learning process.

Figure 1A:
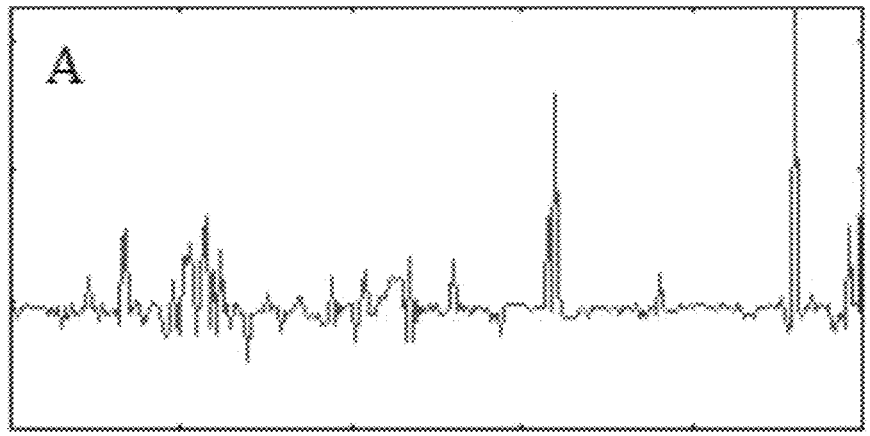
FIGS. 1A and 1B illustrates examples of typical time-series.
Figure 1B:
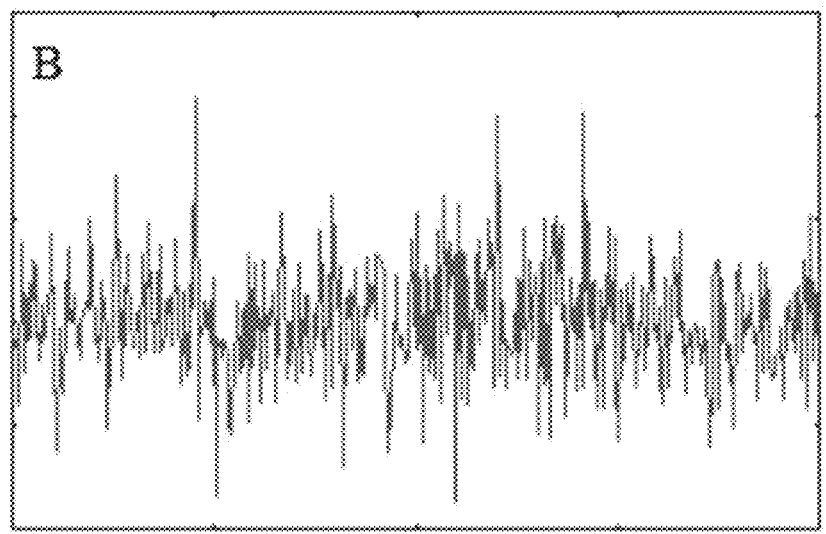

For a time-series classification, an unsupervised feature space integrated residual mapping is known to enrich the learning process by introducing newer representation. The presence of intricate and diverse patterns in practical time series signals demand rich feature space exploration that covers not only temporal, but also spectral as well as time-frequency characterization. An example of a typical time-series is depicted with reference to FIGS. 1A and 1B.

The time series signals are usually noisy and non-stationary with high degree of stochasticity. For the purpose of analyzing time series, particularly sensor time series signals, the classification tasks need to essentially understand the intricate details of the time series from different domains like statistical, spectral and wavelet.

The representation space augmentation tries to minimize the training error through introducing model complexity. In a known scenario, the residual learning is enriched with new representation through unsupervised feature space augmentation that refines the residual channel of Residual Network to enhance the model complexity as well as improving the training loss. For example, the unsupervised signal processing feature set $\Omega=[\omega_1, \omega_2, \omega_3, \ldots, \omega_\beta]$ transforms the input time series signals $\mathbb{R}^T \rightarrow \Omega \in \mathbb{R}^\beta$ to $\beta$-dimension feature vectors and incorporating the external feature vectors $\Omega$ refine the residual map. The process of concatenation of additional signal processing features eases the learnability in high-dimensional space. However, in such network, it is to be ensured that network growth is made restricted as a function of the time series signal dynamics. The residual mapping may be refined by introducing unsupervised features to boost training performance for high training accuracy and auto-tuned regularizations to tune the network parameters for improving the generalization accuracy.

Various embodiments disclose method and system for mitigating generalization loss in deep neural network for time series classification such that the network growth is made restricted as a function of the time series signal dynamics. For example, in an embodiment, the disclosed method and system mitigates generalization loss in deep neural network by dynamic regularization. Regularization is of utmost importance to construct a better-learned network. In an embodiment, the disclosed system applies L1 regularization for regulating the complexity of the NN model introduced by feature space augmentation and learning rate adaptation is introduced for smoother gradient descent. L1 regularization imparts possibility of sparser and interpretable model. Moreover, in an embodiment, the disclosed system utilizes a Mod-Adam, a modified adaptive moment estimation (Adam optimizer) optimization for updating network weights. In Mod-Adam, through the inspection of the generalization loss, the learning rate value is directly decayed to enable smoother learning convergence. Mod-Adam indirectly helps to minimize the generalization loss.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 2:
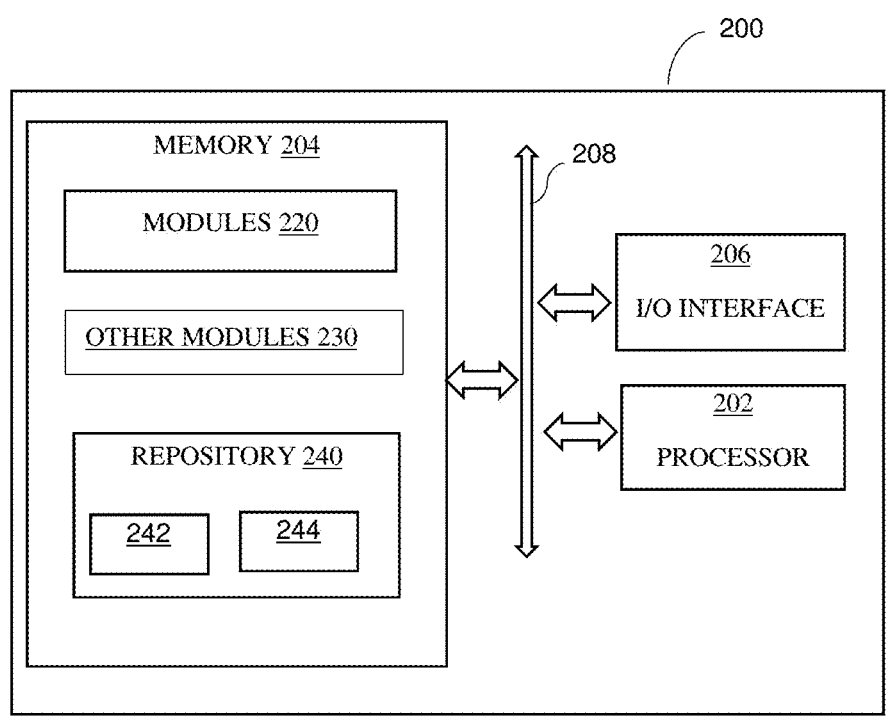
FIG. 2 illustrates a block diagram of a system for mitigating generalization loss in deep neural network for time series classification according to some embodiments of the present disclosure.
Figure 3:
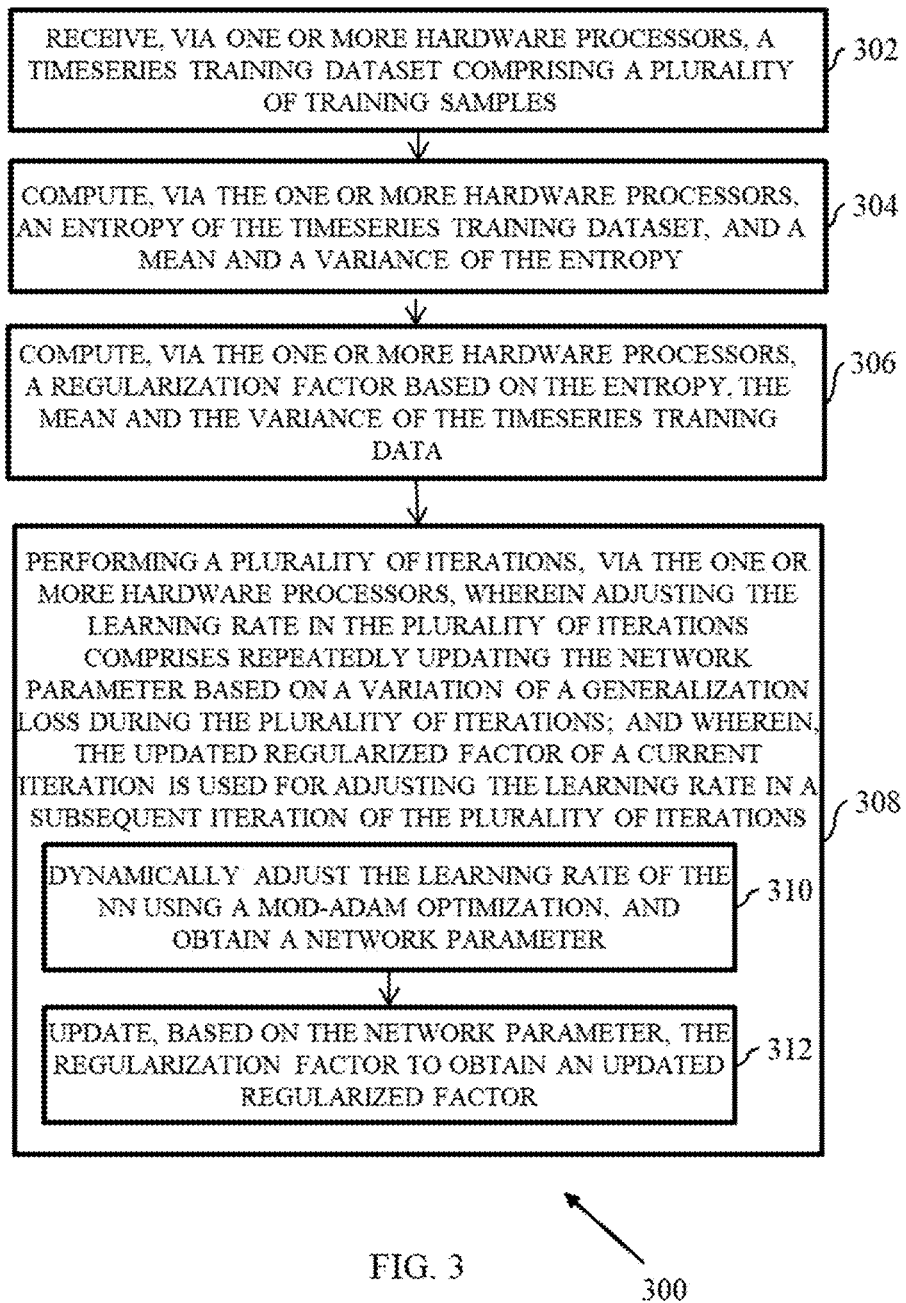
FIG. 3 illustrates a flow diagram of a method for mitigating generalization loss in deep neural network for time series classification, in accordance with an example embodiment.
Figure 4:
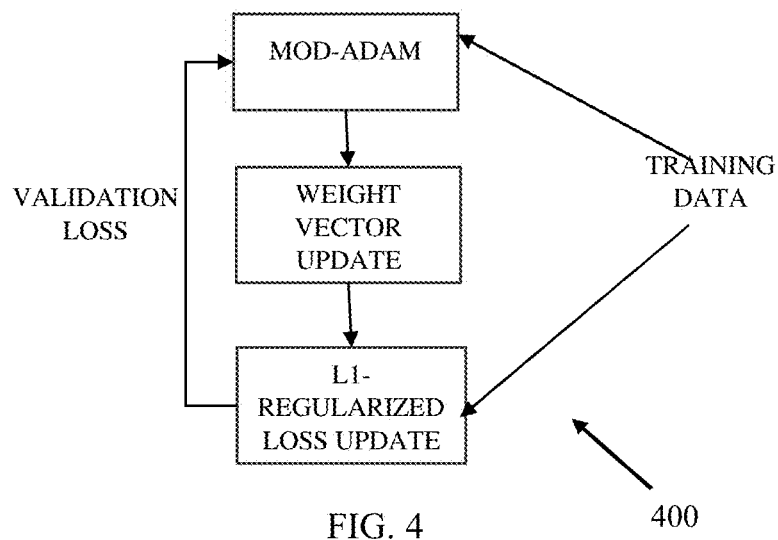
FIG. 4 is a block diagram of an exemplary computer system for implementing embodiments consistent with the present disclosure.

Referring now to the drawings, and more particularly to FIG. 2 through 4, where similar reference characters denote corresponding features consistently throughout the figures, there are shown preferred embodiments and these embodiments are described in the context of the following exemplary system and/or method.

FIG. 2 illustrates a block diagram of a system 200 for mitigating generalization loss in deep neural network for time-series classification, according to some embodiments of the present disclosure. In an embodiment, the disclosed system 200 is capable of regularizing the deep neural network exploiting the time series signal dynamics to attempt the minimization of generalization loss.

The system 200 includes or is otherwise in communication with one or more hardware processors such as a processor 202, at least one memory such as a memory 204, and an I/O interface 206. The processor 202, memory 204, and the I/O interface 206 may be coupled by a system bus such as a system bus 208 or a similar mechanism. The I/O interface 206 may include a variety of software and hardware interfaces, for example, a web interface, a graphical user interface, and the like The interfaces 206 may include a variety of software and hardware interfaces, for example, interfaces for peripheral device(s), such as a keyboard, a mouse, an external memory, a camera device, and a printer. Further, the interfaces 206 may enable the system 200 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types.

The repository 240, amongst other things, includes a system database 242 and other data 244. The other data 244 may include data generated as a result of the execution of one or more modules in the other modules 230.

In an embodiment, the system 200 regularizes the deep network exploiting the time series signal dynamics to attempt the minimization of generalization loss. As described before, stochasticity of practical time series signals (examples: accelerometer, engine noise, household energy consumption signal from smart energy meter, etc.) induced develop signal dynamics explored L1 regularization factor setting. In an embodiment, the disclosed system 200 facilitates auto-tuning of regularization by setting regularization factor as a function of the training set distribution such that the dynamics of the training time series impact the regularization process. An appropriate setting of L1 regularization relaxes the model to underplay the higher learnability with the consequence of complex representation space as an outcome in the process of enrichment of residual learning by signal processing feature space augmentation.

As seen above, the disclosed system facilitates in auto-tuning regularization by setting a regularization factor associated with the training of a NN on these timeseries signals (of training timeseries data) as a function of the training set distribution such that the dynamics of the training time series impact the regularization process. A technical advantage of the present embodiments is that an appropriate setting of the regularization factor can relax the model to underplay the higher learnability with the consequence of complex representation space as an outcome in the process of enrichment of residual learning by signal processing feature space augmentation.

The system 200 further facilitates continuous adaptation of learning rate for smoother convergence with generalization loss. The update of parameters ($\omega$) at the $\xi$-th epoch in a deep neural network follows the following equation:

$$\omega_\xi \leftarrow \omega_{\xi-1} - \alpha \nabla \omega_{\xi-1} f(\omega_{\xi-1})$$

$$\omega_\xi \leftarrow \omega_{\xi-1} - \alpha g(\omega_{\xi-1})$$

$$g(\omega_{\xi-1}) = \nabla \omega_{\xi-1} f(\omega_{\xi-1})$$

Where, $f(\omega_{\xi-1})$ is a stochastic objective function with parameters $\omega_{\xi-1}$, $\alpha$ is the learning rate and $\nabla \omega_{\xi-1} f(\omega_{\xi-1})$ denotes the gradient w.r.t $f(\omega_{\xi-1})$. Adam optimization method updates of the network parameters by changing the $g(\omega_{\xi-1})$, $$g(\omega_{\xi-1}) \xrightarrow{Adam} g_{Adam}(\omega_{\xi-1})$$

which in effect, impacts the values of w. However, the learning rate parameter $\alpha$ is made fixed (typically, $\alpha$=0.001). In an embodiment, the system 200 utilizes Mod-Adam optimization, that dynamically modifies $\alpha$ based on the trend of validation loss over the epochs. Thus, the parameter updation of Mod-Adam is:

$$\omega_\xi \leftarrow \omega_{\xi-1} - \alpha_\xi^{Mod\text{-}adam} g_{Adam}(\omega_{\xi-1}).$$

Mod-Adam factors in the generalization loss while calculating $\omega\xi$ for providing better and intelligent path to convergence by indirectly leading to a path of generalization loss minimization. These are other features of the present embodiments are disclosed further with reference to FIGS. 3-4.

Referring now to FIG. 3, a flow diagram of a method 300 for mitigating generalization loss in deep neural network for time-series classification is illustrated in accordance with an example embodiment. FIG. 4 illustrates a process diagram of a method 400 for mitigating generalization loss in deep neural network for time-series classification, in accordance with an example embodiment. The methods 300/400 may be executed by a system, for example, the system, 200 of FIG. 2. In an example embodiment, the system 200 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300/400 are described with help of system 200. However, the operations of the method 300 can be described and/or practiced by using any other system.

The method 300 initiates at 302 upon receiving a timeseries training dataset comprising a plurality of training samples. For example, the time series signal $\chi=[x_1, x_2, x_3, \ldots, x_T] \in \mathbb{R}^T$ is an ordered set of real values. The training dataset $\mathcal{T}_{Train}=[\chi_{Train}, \mathcal{L}_{Train}]$, where training dataset $\mathcal{T}_{Train}$ consists of M number of training instances, such that: $x_{Train}=[x_{Train}^1, x_{Train}^2, \ldots x_{Train}^M]$, and each of the training instance consists of T number of samples, $x_{Train}^M \in \mathbb{R}^T, \forall m, m=[1, 2, \ldots, M]$, $\mathcal{L}_{Train}^M$ denotes the labels, $\mathcal{L}_{Train}=[\mathcal{L}_{Train}^1, \mathcal{L}_{Train}^2, \mathcal{L}_{Train}^3, \ldots, \mathcal{L}_{Train}^M]$, $\mathcal{L}_{Train}^M \in [1, \mathcal{C}], \forall m$, labels correspond to one of the $\mathcal{C}$ classes, $\mathcal{L}_{Train}^M \in \mathbb{Z}$.

As previously described, the risk of overfitting on training dataset when the model attempts to fit to a high-dimension feature vector can be minimized by reducing the complexity of the model through regularization. Hence, a neural network model through augmented feature space by $\Omega(\chi)$ is overly complex in order to be able to capture the finer signatures in training time series datasets. Hence, the regularization process requires to provide sparser solution.

A learning problem is to estimate a parametrized function with vector of weight parameters ω to the objective function J such that the regularized objective function $\tilde{J}$ becomes:

$$\tilde{J}(\omega; x_{Train}, \mathcal{L}_{Train}) = J(\omega; x_{Train}, \mathcal{L}_{Train}) + \lambda_1 \|\omega\|_1$$

where, the hyperparameter $\lambda_1 \in (0, \infty]$ is the $L_1$ regularization factor.

The value of $\lambda_1$ plays an important role to control the sparsity in the model. When $\lambda_1 \to 0$ or the value of $\lambda_1$ is too low, the regularization process may have no impact (over fitment problem), whereas, high value of $\lambda_1$ results in high amount of sparsity with large number of ω=0 (under fitment problem). In order to avoid both of the situations, a λi is to determined that is not predefined (or fixed) but depends on the training data distribution. Herein, the randomness or quantitatively the information uncertainty in a training set disturbs the learning process more than a regular training data distribution, where the information uncertainty is measured by computing entropy, for example Shannon entropy Entr(.). At 304, the method 300 includes computing an entropy of the timeseries training dataset, and a mean and a variance of the entropy.

For a discrete random variable X with outcomes $x_1, x_2, \ldots, x_n$ and pr($x_i$) denotes the probability of $x_i$, $$Entr(X) = \sum_{i=1}^{n} pr(x_i) \log_2 \left(\frac{1}{pr(x_i)}\right)$$

When Shannon entropy among the training instances of Entr(χTrain) is more dispersed, a stricter regularization or more sparsity or higher $\lambda_1$ may be required for restricting the impact of learnability due to the randomness in the training distribution. The value of $\lambda_1$ for training dataset $\chi_{Train}$ is quantitively estimated by the index of dispersion of the entropy of $\chi_{Train}$ as described below.

In an embodiment, the entropy for timeseries training dataset is computed to obtain an entropy vector, $Entr(x_{Train}^M)$, having a plurality of Shannon entropy values associated with the plurality of instances. The index of dispersion of the entropy is determined based on a mean ($Entr_{mean}$) and variance ($Entr_{var}$) of the entropy. In an embodiment, the index of dispersion is computed as:

$$Entr_{ID} = \frac{Entr_{var}}{Entr_{mean}}$$

where:
$Entr_{var}$=variance(Entr($x_{train}$))
$Entr_{mean}$=mean(Entr($x_{train}$))

At 306, a regularization factor is computed based on the entropy, the mean and the variance (or the index of dispersion) of the timeseries training data. The regularization factor is computed as:

$$\lambda_1 = \lambda_{scale} \times Entr_{ID}$$

where: $\lambda_{scale}$ is the scale factor.

An algorithmic representation of the method for computation of the regularization factor is shown below:
Algorithm for finding $\lambda_1$ is described below:

---

Algorithm I - Finding $\lambda_1$

1: Input: $\chi_{Train}$, scale factor: $\lambda_{scale}$
2: Output: $\lambda_1$
3: Compute Entr($\chi_{Train}$), where $\chi_{Train}$ consists of number of instances, $x_{Train} = [x_{Train}^1, x_{Train}^2, \ldots x_{Train}^M,]$, and each of the instances consist of T number of samples, $x_{Train}^M \in \mathbb{R}^T$. Entr($x_{Train}^M$), m = 1, 2, 3, . . . M, is computed for each of the M number of training instances in $\chi_{Train}$. Entr($\chi_{Train}$) is a vector that consists of M number of Shannon entropy values.
4: Compute Entrvar = variance(Entr($\chi_{Train}$))
5: Compute Entrmean = mean(Entr($\chi_{Train}$))
6: Index of dispersion: $Entr_{ID} = Entr_{var}/Entr_{mean}$
7: $\lambda_1 = \lambda_{scale} \times Entr_{ID}$
8: END

---

It is to be noted that for different types of datasets, $\lambda_1$ changes as per the algorithm 1 and $\lambda_1$ auto-tunes with the overall distribution of the training instances.

In order to get smoother convergence towards the optimal network parameters (ω), the learning rate is adjusted to decay over a plurality of iterations or epochs. At 308, the plurality of iterations are performed to adjust the learning rate by repeatedly updating the network parameter based on a variation of a generalization loss during the plurality of iterations. In each iteration of the plurality of iterations, the learning rate of the deep neural network is dynamically adjusted using a Mod-Adam optimization (at 310), and a network parameter is obtained at 312. In order to adjust the learning rate of the deep neural network for a current instance from amongst a plurality of training instances using the Mod-Adam optimization, the one or more hardware processors are configured to receive the training timeseries dataset for the current instance, and compute, for a set of iterations in the current instance, the learning rate by using the Shannon entropy of the current instance with respect to a minimum observation window and a maximum observation window of the current instance. Further, it is determined whether, for a consecutive $\vartheta$ number of iterations, the generalization loss of the current iteration from amongst the set of iterations is greater than the generalization loss of a preceding iteration from amongst the set of iterations. On determination of the generalization loss of the current iteration being greater than the generalization loss of the preceding iteration, the learning rate is updated to obtain an updated learning rate. Mathematically, the method of adjusting the learning rate is described below.

The Mod-Adam optimization updates the learning rate $\alpha$ (to obtain an updated learning rate) by observing how the generalization loss behaves over the epochs. When the generalization loss does not change over a ($\vartheta$) number of epochs, the stochastic optimization needs to be adjusted by slowing down $\alpha$. The proposed Mod-Adam learning rate adaptation updates the weights/network parameter as:

$$\omega_\xi \leftarrow \omega_{\xi-1} - \alpha_\xi^{Mod-Adam} X \frac{\hat{m}_\xi}{\sqrt{\hat{\mu}_\xi} + e},$$

where $\alpha_\xi^{Mod-Adam}$ is the learning rate by Mod-Adam at nth epoch, $m_\xi$ is the bias-corrected first moment estimate and
$\mu_\xi$ is the bias-corrected second raw moment estimate from the Mod-Adam optimizer.

The decay rate of $\alpha_\xi^{Mod-Adam}$ depends on the distribution of $\chi_{Train}$. Quantitatively, Shannon entropy provides the numerical estimate of the distribution of $\chi_{Train}$. The value of $\alpha_\xi^{Mod-Adam}$ can vary at each of the training instances in $x_{Train} = [x_{Train}^1, x_{Train}^2, \ldots, x_{Train}^M]$, and may change after certain epochs in the learning process. The decay of $\alpha_\xi^{Mod-Adam}$ is exponential by factor $\alpha_{exp}$ (usually, $\alpha_{exp}=0.5$) and dependent on the generalization loss observation window $\vartheta$. The observation window $\vartheta$ is computed from Shannon entropy $Entr(x_{Train})$ of the training instance with respect to the minimum and maximum observation windows: $\vartheta_{min}$ and $\vartheta_{max}$ respectively. Observation windows includes number of epochs, $\vartheta_{min}, \vartheta_{max} \in \mathbb{Z}+$. In an embodiment, $\vartheta_{max} = \lfloor\sqrt{Total\_number\_of\_epochs}\rfloor$.

When the generalization loss does not improve over the observation window $\vartheta \in \mathbb{Z}+$, the learning rate decays by the factor $\alpha_{exp}$. Thus, the learning rate $\alpha_\xi^{Mod-Adam}$ or the weight (network parameter) updation process responds to the trend in generalizability of the model and decays for smoother gradient descent. An algorithm for computing the decay and optimal network parameter is illustrated below:

---
Algorithm 2- Mod-Adam: Algorithm for finding $\alpha_\xi^{Mod-Adam}$ and $\omega_\xi^{Mod-Adam}$ (Showing for a single training instance $x_{Train}^1$)
---

1: Input: $x_{Train}^1$, minimum observation window $\vartheta$min, maximum observation window $\vartheta_{max}$ ($\vartheta_{max} = [\sqrt{Total\_number\_of\_epochs}]$), initial learning rate $\alpha_0$ (usually, $\alpha_0 = 0.001$), $\alpha_{exp}$ (usually, $\alpha_{exp} = 0.5$), $\varepsilon^{\xi-1}, \varepsilon^\xi$ denotes validation loss at $(\xi - 1)^{th}$ and $\xi^{th}$ epochs respectively.

2: Output: $\omega_\xi^{Mod-Adam}$ (updated network parameter at $\xi^{th}$ epoch)

3: $\alpha_{\xi=0}^{Mod-Adam} = \alpha_0$

4: Compute $\psi^1 = Entr(x_{Train}^1)$

5: Compute $\hat{\vartheta}_{max} = \frac{\vartheta_{max}}{\psi^1}$ (Corrected maximum observation window)

6: Compute observation window: $\vartheta = \lfloor\max(\vartheta_{max}, \vartheta_{min})\rfloor$ ---
-continued Algorithm 2- Mod-Adam: Algorithm for finding $\alpha_\xi^{Mod-Adam}$ and $\omega_\xi^{Mod-Adam}$ (Showing for a single training instance $x_{Train}^1$)
---

7: IF $(\varepsilon^{\xi-1} - \varepsilon^\xi) \geq$ at $\xi^{th}$ epoch for consecutive $\vartheta$ number of epochs:

$$\alpha_\xi^{Mod-Adam} \leftarrow (\alpha_{\xi-1}^{Mod-Adam})^{\alpha_{exp}}$$

(learning rate updated at $\xi^{th}$ epoch)

8: $\omega_\xi \leftarrow \omega_{\xi-1} - \alpha_\xi^{Mod-Adam} X \frac{\hat{m}_\xi}{\sqrt{\hat{\mu}_\xi} + e},$ $m_\xi$ is the bias-corrected first moment estimate and $\mu_\xi$ is the bias-corrected second raw moment estimate from the Adam optimizer. For computing $m_\xi, \mu_\xi$ two hyperparameters are to be considered: $\beta_1$ and $\beta_2$; the values of $\beta_1 = 0.9, \beta_2 = 0.999$ and $\varrho = 10^{-8}$.

9: END

In an embodiment, the updated regularized factor of the current iteration is used for adjusting the learning rate in a subsequent iteration of the plurality of iterations. An example scenario for mitigating generalization loss in deep neural network for time series classification is described below in accordance with an various embodiments.

Example Scenario

The disclosed deep neural network (embodying the disclosed system, for example the system 200) for TSC consists of three residual blocks and each of the residual blocks consists of number of convolution networks of stride length=1 with Batch Normalization (BN) and ReLU activation function. The first residual block consist of three convolution networks with kernel size [8, 5, 3], second residual block consists of six convolution networks with kernel size [8, 7, 6, 5, 4, 3] and the third residual block consists of three convolution networks with kernel size [8, 5, 3]. The deep neural network additionally consists of auto-tuned regularizer to dynamically vary the learning rate and to set the L1 regularization factor as depicted in Algorithm 1. Learning rate is dynamically configured by the proposed Mod-Adam algorithm (Algorithm 2). Important network parameters are described in Table I. Herein, a total of 392 features (including long-term and short-term features) were considered which were derived from the base transformations that were concatenated at the fully connected network layer.

TABLE I

| HYPERPARAMETERS FOR DEEP NN | |
|---|---|
| Total number of iterations or epochs | 1500 |
| λscale: L1 regularization scale factor for finding λ1 | $10^{-3}$ |
| σmin: minimum observation window | 2 |
| β: Number of unsupervised features) | 392 |

The results depicted in Table II illustrate performance over the test datasets from a UCR time series database. The obtained results of the disclosed deep neural network demonstrate a stellar achievement in solving TSC problems.

TABLE II

Test accuracy comparison of disclosed DNN model with state-of-the-art algorithms

| Dataset | Length | No. of classes | No. of Training Examples | 1-NN DTW | BOSS | COTE | Auto ML | Res Net | Disclosed DNN |
|---|---|---|---|---|---|---|---|---|---|
| Adiac | 176 | 37 | 390 | 60.33 | 74.94 | 80.98 | 86.7 | 82.6 | 86.75 |
| Car | 577 | 4 | 60 | 66.56 | 85.5 | 89.9 | 80 | 93.3 | 93.76 |
| Medical Images | 99 | 10 | 381 | 74.11 | 71.45 | 78.5 | 76.71 | 77.2 | 78.82 |
| Fish | 463 | 7 | 175 | 76.32 | 96.87 | 96.22 | 80.13 | 98.9 | 99.03 |

Data description: For fair comparison with relevant state-of-the-art, such that only reported (or published) test results are compared, the comparative study is described in table (Table II), where 4 datasets are compared. The complete description of all the datasets are publicly available. These datasets are from number of heterogeneous domains (mainly comprising of IoT applications) like medical images, automobile (car), fish, and so on with number of training instances or examples varying [60, 390], number of samples at each of the training instances varying [99, 577], and the number of classes varying [4,37].

Performance metric: The test accuracy was used as the performance benchmark. The model was trained by the training datasets and learned model is tested over the test datasets.

State-of-the-art algorithms for comparison: Referring to Table II, the disclosed method outperforms state-of-the-art algorithms like ResNet, AutoML, COTE, BOSS, 1NN-DTW.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for mitigating generalization loss in deep neural network for time series classification. In an embodiment, the model growth is controlled by a regularization process and smoother learning convergence is achieved by validation loss dependent learning rate. The disclosed system, embodied in the deep neural network model, is capable of adapting the learning rate decay through learning over the trend of validation loss and modify the network parameter update process of Adam optimizer. An important contribution of the disclosed embodiments is that the training signal dynamics controls the regularization and learning rate adaptation.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for mitigating generalization loss in deep neural network (DNN) for time series classification, the method comprising:
   receiving, via one or more hardware processors, a time-series training dataset comprising a plurality of training samples;

computing, via the one or more hardware processors, an entropy of the timeseries training dataset, and a mean and a variance of the entropy;

computing, via the one or more hardware processors, a regularization factor based on the mean and the variance of the entropy and facilitating auto-tuning of regularization by setting the regularization factor which relaxes the DNN to underplay higher learnability by using representation space augmentation which minimizes training error, wherein the representation space augmentation is performed by introducing model complexity and enriching residual learning by unsupervised feature space augmentation that refines residual channel of residual network, wherein the residual learning is introduced to solve learning degradation problem in the time series data set when depth of the deep neural network is increased, wherein computing the regularization factor comprises:

computing the entropy for each of the plurality of training samples to obtain a vector having a plurality of entropy values associated with each of the plurality of iterations;

computing an index of dispersion of the entropy based on the mean and variance of the entropy; and computing the regularization factor associated with the training timeseries data based on the index of dispersion and a scale factor of the entropy;

performing a plurality of iterations, via the one or more hardware processors, wherein each iteration of the plurality of iterations comprises:

dynamically adjusting the learning rate of the DNN using a Mod-Adam optimization, and obtain a network parameter, wherein adjusting the learning rate of the deep neural network for a current instance from amongst a plurality of training instances using the Mod-Adam optimization comprises:

receiving the training timeseries dataset for the current instance;

computing, for a set of iterations in the current instance, the learning rate by using the Shannon entropy of the current instance with respect to a minimum observation window and a maximum observation window of the current instance;

determining whether, for a consecutive J number of iterations, the generalization loss of the current iteration from amongst the set of iterations is greater than the generalization loss of a preceding iteration from amongst the set of iterations; and updating the learning rate to obtain an updated learning rate based on the determination of the generalization loss of the current iteration being greater than the generalization loss of the preceding iteration; and updating, based on the network parameter, the regularization factor to obtain an updated regularized factor, wherein adjusting the learning rate in the plurality of iterations comprises repeatedly updating the network parameter based on a variation of a generalization loss during the plurality of iterations, wherein, the updated regularized factor of a current iteration is used for adjusting the learning rate in a subsequent iteration of the plurality of iterations.

2. The method as claimed in claim 1, wherein the regularization factor comprises L1 regularization factor.

3. The method as claimed in claim 1, wherein the entropy comprises a Shannon entropy.

4. The method as claimed in claim 1, wherein the entropy is represented as below:

$$Entr(X) = \sum_{i=1}^{n} pr(x_i) \log_2\left(\frac{1}{pr(x_i)}\right)$$

where, X denotes a discrete random variable with outcomes x1, x2, . . . , xn and pr (xi) denotes the probability of xi, wherein X is indicative of the training dataset Xtrain.

5. The method as claimed in claim 1, wherein the learning rate for the current iteration is updated by an exponential factor to obtain the updated learning rate.

6. A system for mitigating generalization loss in deep neural network (DNN) for time series classification, comprising:

a memory storing instructions;

one or more communication interfaces; and one or more hardware processors coupled to the memory via the one or more communication interfaces, wherein the one or more hardware processors are configured by the instructions to:

receive a timeseries training dataset comprising a plurality of training samples;

compute an entropy of the timeseries training dataset, and a mean and a variance of the entropy;

compute a regularization factor based on the mean and the variance of the timeseries training dataset and facilitating auto-tuning of regularization by setting the regularization factor which relaxes the DNN to underplay higher learnability by using representation space augmentation which minimizes training error, wherein the representation space augmentation is performed by introducing model complexity and enriching residual learning by unsupervised feature space augmentation that refines residual channel of residual network, wherein the residual learning is introduced to solve learning degradation problem in the time series data set when depth of the deep neural network is increased, wherein computing the regularization factor comprises:

computing the entropy for each of the plurality of training samples to obtain a vector having a plurality of entropy values associated with each of the plurality of iterations;

computing an index of dispersion of the entropy based on the mean and variance of the entropy; and computing the regularization factor associated with the training timeseries data based on the index of dispersion and a scale factor of the entropy;

perform a plurality of iterations, wherein to perform each iteration of the plurality of iterations, the one or more hardware processors are configured by the instructions to:

dynamically adjust the learning rate of the DNN using a Mod-Adam optimization, and obtain a network parameter, wherein adjusting the learning rate of the deep neural network for a current instance from amongst a plurality of training instances using the Mod-Adam optimization comprises: receiving the training timeseries dataset for the current instance;

computing, for a set of iterations in the current instance, the learning rate by using the Shannon entropy of the current instance with respect to a minimum observation window and a maximum observation window of the current instance;
determining whether, for a consecutive y number of iterations, the generalization loss of the current iteration from amongst the set of iterations is greater than the generalization loss of a preceding iteration from amongst the set of iterations; and
updating the learning rate to obtain an updated learning rate based on the determination of the generalization loss of the current iteration being greater than the generalization loss of the preceding iteration; and
update, based on the network parameter, the regularization factor to obtain an updated regularized factor,
wherein to adjust the learning rate in the plurality of iterations, the one or more hardware processors are configured by the instructions to repeatedly update the network parameter based on a variation of a generalization loss during the plurality of iterations, and
wherein, the updated regularized factor of a current iteration is used for adjusting the learning rate in a subsequent iteration of the plurality of iterations.

7. The system as claimed in claim 6, wherein the regularization factor comprises L1 regularization factor.

8. The system as claimed in claim 6, wherein the entropy comprises a Shannon entropy.

9. The system as claimed in claim 8, wherein the entropy is represented as below:

$$Entr(X) = \sum_{i=1}^{n} pr(x_i) \log_2 \left( \frac{1}{pr(x_i)} \right)$$

where, X denotes a discrete random variable with outcomes $x_1, x_2, \ldots, x_n$ and $pr(x_i)$ denotes the probability of $x_i$, wherein X is indicative of the training dataset $X_{train}$.

10. The system as claimed in claim 6, wherein the one or more hardware processors are configured by the instructions to update the learning rate for the current iteration by an exponential factor to obtain the updated learning rate.

11. One or more non-transitory machine readable information storage mediums comprising one or more instructions which when executed by one or more hardware processors cause a method for mitigating generalization loss in deep neural network (DNN) for time series classification, the method comprising:
receiving, via one or more hardware processors, a time-series training dataset comprising a plurality of training samples;
computing, via the one or more hardware processors, an entropy of the timeseries training dataset, and a mean and a variance of the entropy;
computing, via the one or more hardware processors, a regularization factor based on the mean and the variance of the entropy and facilitating auto-tuning of regularization by setting the regularization factor which relaxes the DNN to underplay higher learnability by using representation space augmentation which minimizes training error, wherein the representation space augmentation is performed by introducing model complexity and enriching residual learning by unsupervised feature space augmentation that refines residual channel of residual network, wherein the residual learning is introduced to solve learning degradation problem in the time series data set when depth of the deep neural network is increased,
wherein computing the regularization factor comprises:
computing the entropy for each of the plurality of training samples to obtain a vector having a plurality of entropy values associated with each of the plurality of iterations;
computing an index of dispersion of the entropy based on the mean and variance of the entropy; and
computing the regularization factor associated with the training timeseries data based on the index of dispersion and a scale factor of the entropy;
performing a plurality of iterations, via the one or more hardware processors, wherein each iteration of the plurality of iterations comprises:
dynamically adjusting the learning rate of the DNN using a Mod-Adam optimization, and obtain a network parameter, wherein adjusting the learning rate of the deep neural network for a current instance from amongst a plurality of training instances using the Mod-Adam optimization comprises:
receiving the training timeseries dataset for the current instance;
computing, for a set of iterations in the current instance, the learning rate by using the Shannon entropy of the current instance with respect to a minimum observation window and a maximum observation window of the current instance;
determining whether, for a consecutive 2 number of iterations, the generalization loss of the current iteration from amongst the set of iterations is greater than the generalization loss of a preceding iteration from amongst the set of iterations; and
updating the learning rate to obtain an updated learning rate based on the determination of the generalization loss of the current iteration being greater than the generalization loss of the preceding iteration; and
updating, based on the network parameter, the regularization factor to obtain an updated regularized factor,
wherein adjusting the learning rate in the plurality of iterations comprises repeatedly updating the network parameter based on a variation of a generalization loss during the plurality of iterations, and
wherein, the updated regularized factor of a current iteration is used for adjusting the learning rate in a subsequent iteration of the plurality of iterations.

* * * * *